United States Patent [19]
Hansson

[11] Patent Number: 6,047,455
[45] Date of Patent: Apr. 11, 2000

[54] METHOD FOR SIMULTANEOUS TIGHTENING OF TWO OR MORE SCREW JOINTS

[75] Inventor: Gunnar Christer Hansson, Stockholm, Sweden

[73] Assignee: Atlas Copco Tools AB, Nacka, Sweden

[21] Appl. No.: 09/043,561

[22] PCT Filed: Sep. 18, 1996

[86] PCT No.: PCT/SE96/01155

§ 371 Date: May 26, 1998

§ 102(e) Date: May 26, 1998

[87] PCT Pub. No.: WO97/10928

PCT Pub. Date: Mar. 27, 1997

[30] Foreign Application Priority Data

Sep. 19, 1995 [SE] Sweden .................................. 9503243

[51] Int. Cl.⁷ .................................................. B23Q 17/00
[52] U.S. Cl. ....................................... 29/407.02; 173/180
[58] Field of Search ............................. 29/407.02; 173/1, 173/5, 6, 11, 176, 178, 181, 182, 180

[56] References Cited

U.S. PATENT DOCUMENTS 4,081,037  3/1978  Jonsson ....................................... 173/1

FOREIGN PATENT DOCUMENTS 427 510  4/1983  Sweden .
1 550 093  8/1979  United Kingdom .
2 261 750  5/1993  United Kingdom .

OTHER PUBLICATIONS

Patent Abstracts of Japan, vol. 16, No. 534 (M—1334) AB Date Apr. 11, 1992 Pat: A 4201022 of JP 4–201022.

Primary Examiner—P. W. Echols
Assistant Examiner—John C. Hong
Attorney, Agent, or Firm—Frishauf, Holtz, Goodman, Langer & Chick, P.C.

[57] ABSTRACT

A method for simultaneous tightening of two or more screw joints to a desired pretension condition by means of a nut running tool having two or more output spindles each having an adjustable output torque, wherein each one of the output spindles is individually operated according to at least one primary tightening parameter from among torque, angular position, time, clampload, and screw joint elongation. An instantaneous value of the at least one primary tightening parameter is continuously detected for each one of the output spindles, and the instantaneous tightening parameter value for each one of said output spindles is continuously compared with a corresponding instantaneous tightening parameter value of each other one of the output spindles. A torque application speed is then continuously adjusted by continuously adjusting a limit of the output torque of one of the output spindles on which the instantaneous tightening parameter value exceeds a predetermined boundary in relation to any other one of the spindles.

12 Claims, 2 Drawing Sheets

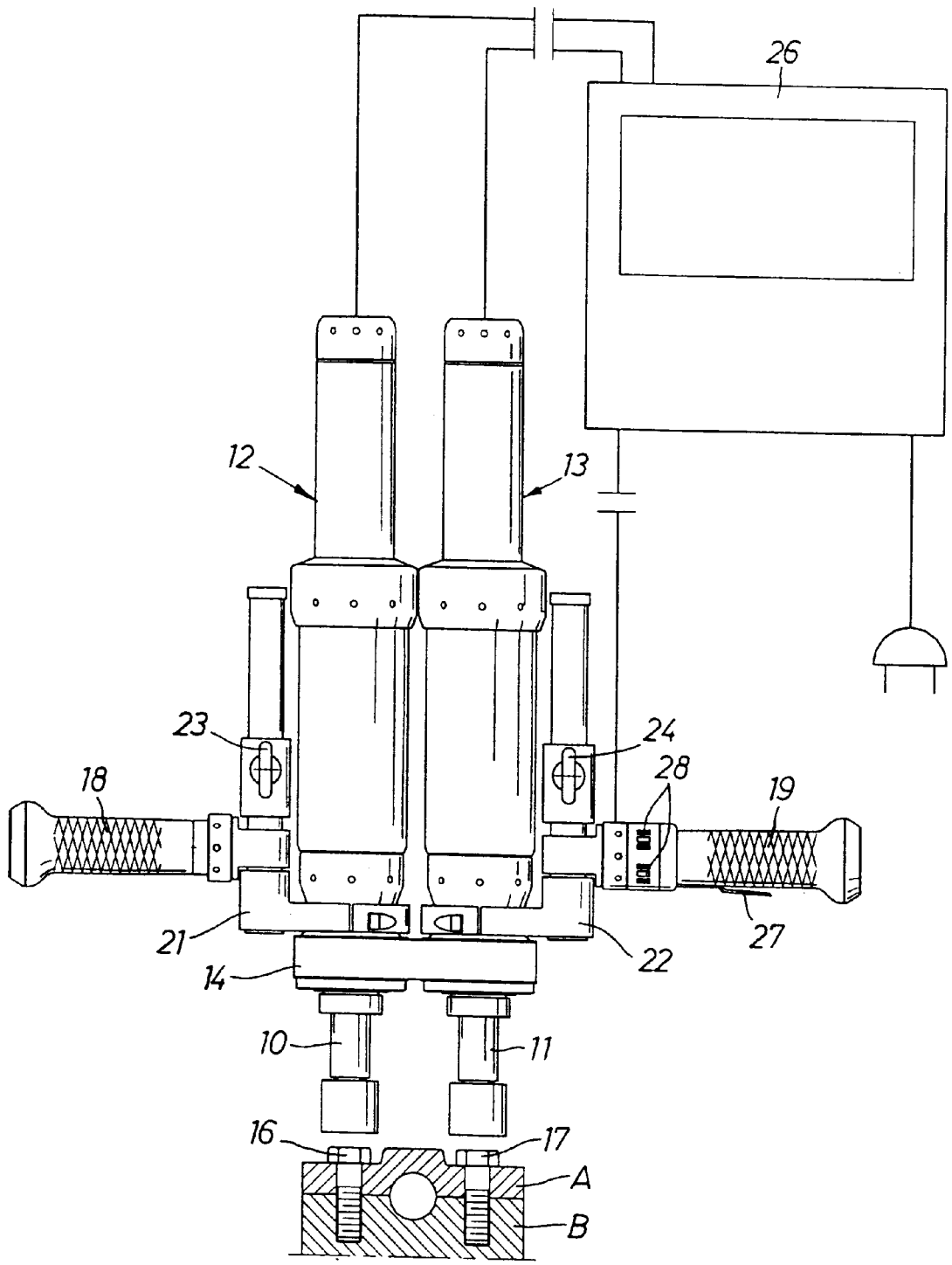

METHOD FOR SIMULTANEOUS TIGHTENING OF TWO OR MORE SCREW JOINTS

The invention relates to a method for simultaneous tightening of two or more screw joints by means of a nut running tool having two or more output spindles.

BACKGROUND OF THE INVENTION

A problem concerned with previous tightening methods for pretensioning two or more screw joints at the same time is to obtain a balanced and even clamping force build-up between the parts being joined by the screw joints. One such method is described in Japanese Patent Application No.: JP 900335746 (Publication No.: JP 4201022). According to this know method, all joints are run down in a first step to a seated condition. Thereafter, the pretensioning phase is started for all joints, and during an initial stage, the individual torque growth characteristics for the joints are determined followed by an adjustment of the rotation speed of each spindle so as to aim at a simultaneous arrival of the screw joints to the desired torque level.

This known method for tightening process control is disadvantageous an that it is too slow, not only due to the tightening process being carried out in two steps, but also due to the torque growth adaptation by speed adjustment being too slow. The control of the process is also insufficient due to the speed adjustment being carried out only once. This may be sufficient to obtain some compensation at ideal joints having linear torque growth characteristics, but will result in unacceptable differences in tightening time for reaching a common predetermined torque or clamping force level at joints having different nonlinear torque rates, i.e. different torque/angle characteristics. This in turn would result in an undesired uneven claping force application on critical machine parts like shaft bearing caps and cylinder heads of internal combustion engines.

Another drawback concerned with this and other known methods for simuultaneous tightening of two screw joints is the risk for damage to the equipment and injury to the operator in case one of the two output spindles loosens its grip on the screw head or nut being tightened, because if the reaction support for one of the spindles is lost the entire nutrunner is exposed to the reaction torque from the other spindle. This is a safety risk for the operator who has to counteract the reaction torque by muscle force.

SUMMARY OF THE INVENTION

An object of the invention is to create a method for simultaneous tightening of two or more screw joints by means of a nut runing tool having two or more output spindles, whereby a balanced and even clamping of the joint parts is obtained. According to one aspect of the invention this is accomplished by a tightening process wherein all spindles are operated according to a predetermined tightening strategy with respect to at least one primary tightening parameter from among rotation speed, output torque, angle, time, clampload and screw joint elongation. The instantaneous value of such parameter on each one of the spindles is continuously detected and compared with the instantaneous parameter value on the other spindles, whereupon the rotation speed is continuously adjusted on that one of the spindles on which the highest (or alternatively the lowest) instantaneous value is detected sio as to maintain the continued torque load on that spindle within a predetermined boundary in relation to that one of the other spindles momentarily having the highest (or alternatively the lowest) torque load.

According to an alternative aspect of the invention, the tightening process is carried out under detection of the instantaneous value of a primary tightening parameter on each spindle, and adjusting continuously the rotation speed of each spindle but one spindle to accomplish a tightening parameter value on the individual spindle that is equal to that of that one spindle, thereby accomplishing a fast and universally useful tightening method.

A further object of the invention is to form a tightening method for a two-spindle nutruuner by which the safety risk related to a lost screw joint grip is eliminated.

The invention is below described in further detail with reference to the accompanying drawings.

BRIEF DESCRIPTION OF THE DRAWINGS

FIG. 4 shows a two-spindle power nutrunner for carrying out the method according to the invention.

DETAILED DESCRIPTION

Figure 1:
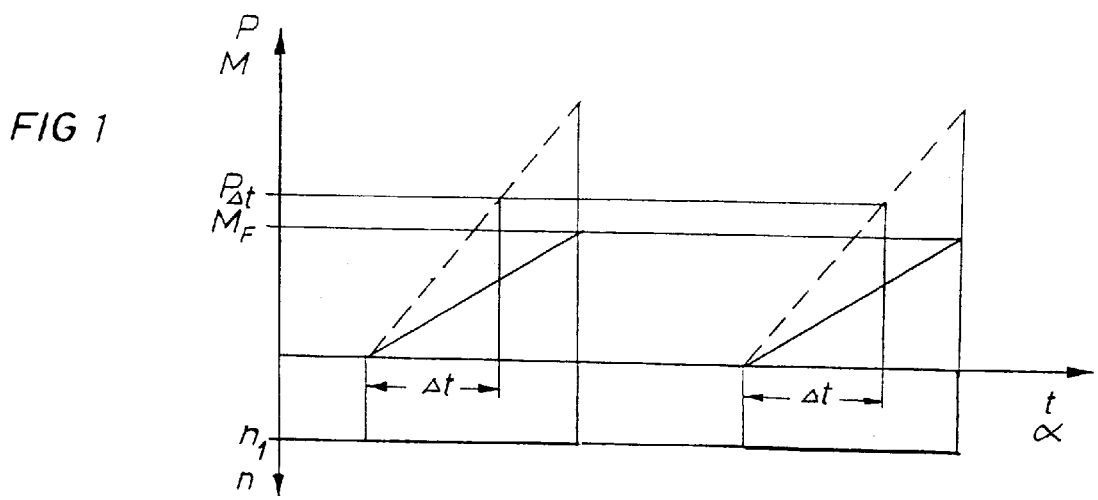
FIG. 1 shows a diagram illustrating tightening of two screw joints having an ideal linear torque rate.

As illustrated in FIG. 1, tightening of for instance two screw joints which have ideal linear torque rates may be carried out at the same constant rotation speed and will reach the desired final torque or pretension level at the same time.

In the diagram in FIG. 1, the torque/angle curves of the two screw joints are illustrated in straight solid lines, whereas the clamping force characteristics as a function of time are illustrated in straight dash lines. It is also illustrated that the tightening of both joints is carried out at the same constant rotation speed $n_1$.

The linear and equal clamping force characteristics of the two tightening processes illustrated in FIG. 1 are ideal and serve as a model for the clamping force characteristic which is desireable to obtain at different types of screw joints with different non-linear torque rates. Such identical and linear clamping force characteristics for two or more screw joints tightened simultaneously guarantee a balanced and even clamping force application on the parts being joined.

Figure 2:
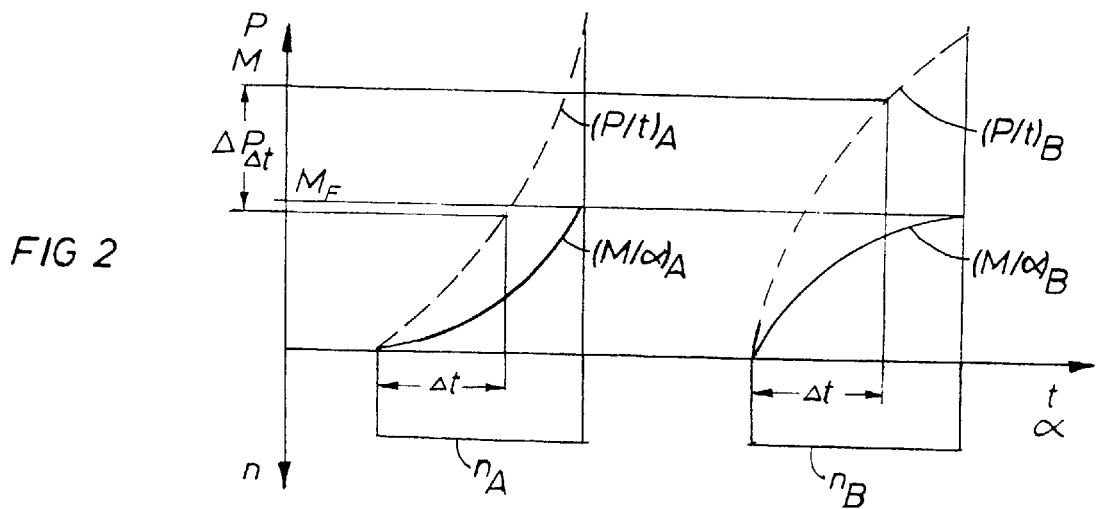
FIG. 2 shows a diagram illustrating tightening according to a prior art method of two screw joints having different nonlinear torque rates.

In the diagram shown in FIG. 2, there are illustrated in solid lines the torque rate $M/\alpha$ curves of two different joints A and B. From the diagram it is apparent that the torque rates $M/\alpha$ of the two joints are completely different. In joint A, the torque/angle curve $(M/\alpha)_A$ has a low derivative during the first part of the tightening process, but has a successively increasing derivative at increasing angle of rotation $\alpha$.

As illustrated in dash line, the clamping force growth as a function of time $(P/t)_A$ will have a similar characteristic during the tightening process if the rotation speed $n_A$ of the nutrunrer spindle is constant.

The same reasoning is applicable on screw joint B which has a torque rate $(M/\alpha)_B$ of a characteristic opposite to that of joint A. Thus, the derivative of the torqe/angle curve $(M/\alpha)_B$ of screw joint B is hgh at the start but decreases successively at increasing rotation angle $\alpha$. If tightening joint B at the same constant rotation speed as by joint A, $n_A=n_B$ the clamping force growth as a function of time $(P/t)_B$ will have a characteristic similar to that of the torque rate $(M/\alpha)_B$.

If the two screw joints A and B were tightened simiultaneously at a constant speed $n_A=n_B$, there would be obtained a substantial difference in clamping force $\Delta P_{At}$ after a certain time interval $\Delta_t$. See FIG. 2. This would result in an unbalanced and uneven clamping of the machine parts to be joined.

Figure 3:
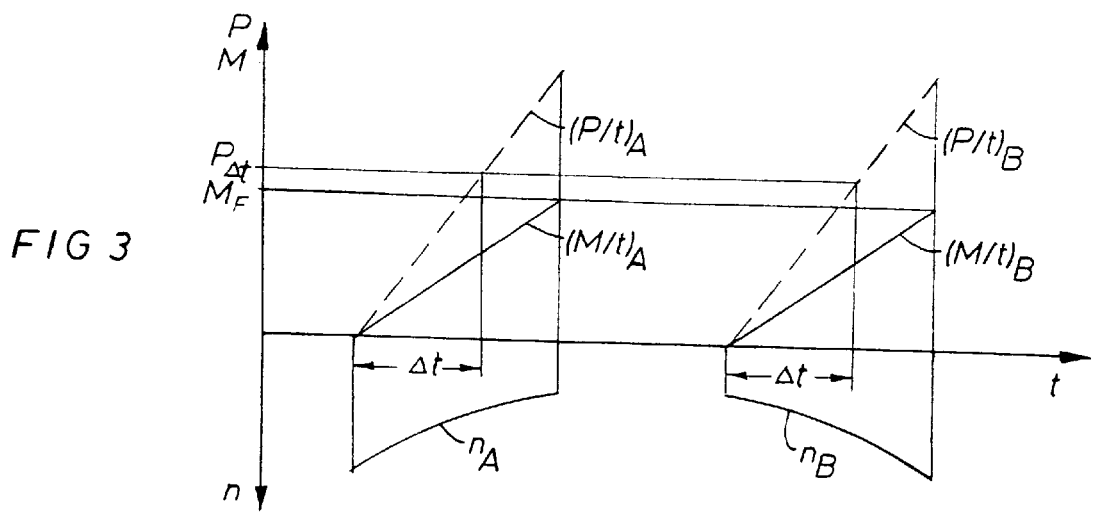
FIG. 3 shows a diagram illustrating tightening by the method according to the invention of two screw joints having different nonlinear torque rates.

In contrast to the tightening processes illustrated in FIG. 2, tightening of the two screw joints A and B by the method according to the invention means that the clamping force growth characteristics P/t as well as the torque growth characteristics M/t as a function of time are equal. See FIG. 3. This also means that the instantaneous clamping forces P are equal for the joints. This is illustrated by the clamping force comparison at a point $\Delta_t$ after the start of the two tightening process, where $P_{At}$ is equal for the two joints.

This favorable clamping force characteristic for the two different screw joints A and B is accomplished by adapting continuously the rotation speed of the individual nutrunner spindles in relation to the instantaneous torque load as illustrated by the non-linear rotation speed curves $n_A$ and $n_B$.

In simple cases where the torque load increases continuously at increasing angle, it suffices to adapt speed. In complex cases where the speed might fall down to zero, the output torque as well has to be controlled.

The method according to the invention means that in practice the rotation speed and torque of each one nutrunner spindle is continuously and individually adjusted so as to adapt the instantaneous torque load of each one spindle to remain within a predetermined torque span in relation to the torque of a master spindle. The master spindle can be preselected or preferably dynamically allocated. The master spindle is operated in accordance with a predetermined rotation speed pattern so as to obtain a torque or clamping force characteristic expectable at the actual type of joint.

One way to apply the method with dynamic master allocation is that a first priority for every spindle is to operate according to a programmed tightening strategy regarding speed, angle, torque, time etc.

At the same time there is monitored the progress of all the other spindles and if the spindle in question runs ahead torquewise more than a certain amount in relation to anyone of the other spindles (dynmic master spindle) there will be an automatic reduction in speed of the spindle in question, or in stationary conditions: a direct output torque reduction to maintain the torque within the predefined boundary. The reduction of torque, however, will always be less than 100% of the difference to the reference spindle, otherwise a chasing effect could occur stopping all spindles.

This results in a balanced and even clamping of the parts to be joined.

The method according to the invention also comprises a feed back feature by which the master spindle and all other the spindles are shut off if the torque load on anyone of the spindles differs by more than a certain amount from the instantaneous torque load on anyone else of the spindles.

This method is also most suitable for avoiding the safety risk at two-spindle nutruners, because if one of the two spindles looses its grip on the screw head or nut being tightened, the reaction torque from the other spindle would cause a rotation of the entire nutrunner which would be hazardous to the operator. By the method according to the invention, this is avoided by a prompt shut-off of both spindles due to a certain detected difference in the instantaneous torque load.

In FIG. 4, there is shown a two-spindle nutrunner suitable for operation in accordance with the above described method The nutrunner comprises two output spindles 10, 11 each rotated by an electric motor unit 12 and 13, respectively. The motor units 12, 13 are rigidly secured to each other at a predetermined relative distance by means of a cross piece 14. The distance between the spindles 10, 11 is determined by the distance between the screw joints to be tightened. In FIG. 4, there is illustrated two parts A and B being clamped together by two screws 16, 17 the relative distance of which deterines the distance between the output spindles 10, 11 of the nutrunner.

In practice, the cross piece 14 is designed so as to enable adjustment of the distance between the output spindles 10, 11 to adapt the nutrunner to different screw joint configurations. This is not, however, a part of the invention and is not described in further detail.

For manual operation of the nutrunner there are provided two laterally extending handles 18, 19. These are secured to two brackets 21, 22 rigidly clamped to the lower ends of the motor units 12, 13. The handle brackets 21, 22 also form supports for suspension yokes 23, 24 by which the nutrunner is connectable to an overhead balancer via suitable cables (not shown).

The motor units 12, 13 are connected to a programmable operation control unit 26. The latter comprises power supply modules for each of the electric motor units 12,13. The control unit 26 is also connected to one of the handles 19 which comprises a lever 27 for operating an on/off switch, and light diods 28 for indicating a completed accepted tightening process or, alternatively, a faulty tightening process.

The control unit 26 is programmed to accomplish a tightening process by a first one of the spindles in accordance with a desired predetermined torque load characteristic as a function of time. The rotation speed of the other spindle is continuously adjusted during tightening so as to adapt the torque load characteristic to that of the first spindle. Thereby, the first spindle acts as a master.

Should one of the two spindles 10, 11 loosen its grip or perhaps never be properly connected to the respective screw head, the reaction torque from the other spindle would cause a rotation of the entire nutrunner. The operator would be exposed to that reaction torque via the handles 18, 19 and would have to counteract that reaction torque by muscle force only. In many cases that reaction torque would be too high and start too sudden for the operator to manager. Injury to the operator and damage to the equipment might be the result.

It should be noted that the method of the present invention can also be applied to a screw joint loosening operation, wherein the output torque is temporarily reverse as one of the screw joints becomes fully loosened so as to maintain a torque engagement with that screw joint.

We claim:

1. A method for simultaneously tightening two or more screw joints to a desired pretension condition by means of a nut running tool having two or more output spindles each having an adjustable output torque, said method comprising:
   individually operating each one of said output spindles according to at least one primary tightening parameter from among torque, angular position, time, clampload, and screw joint elongation;
   continuously detecting an instantaneous value of said at least one primary tightening parameter for each one of said output spindles;
   continuously comparing said instantaneous tightening parameter value for each one of said output spindles with a corresponding instantaneous tightening parameter value of each other one of said output spindles; and continuously adjusting a torque application speed by continuously adjusting a limit of the output torque of one of said output spindles on which the instantaneous tightening parameter value exceeds a predetermined boundary in relation to any other one of the spindles.

2. The method according to claim 1, wherein the output torque of each output spindle is controlled when the torque application speed becomes zero.

3. The method according to claim 2, wherein all of said output spindles are stopped if the instantaneous tightening parameter value of one of said output spindles differs by more than a predetermined amount from the instantaneous parameter value of anyone other one of the output spindles.

4. The method according to claim 3, wherein an amount of adjustment of said continuously adjusted output torque limit is a function of an amount of excess of said tightening parameter value in relation to said predetermined boundary.

5. The method according to claim 2, wherein an amount of adjustment of said continuously adjusted output torque limit is a function of an amount of excess of said tightening parameter value in relation to said predetermined boundary.

6. The method according to claim 1, wherein all of said output spindles are stopped if the instantaneous tightening parameter value of one of said output spindles differs by more than a predetermined amount from the instantaneous parameter value of anyone other one of the output spindles.

7. The method according to claim 6, wherein an amount of adjustment of said continuously adjusted output torque limit is a function of an amount of excess of said tightening parameter value in relation to said predetermined boundary.

8. The method according to claim 1, wherein an amount of adjustment of said continuously adjusted output torque limit is a function of an amount of excess of said tightening parameter value in relation to said predetermined boundary.

9. A method for simultaneously tightening two or more screw joints to a desired pretension condition by means of a nut running tool having two or more output spindles each having an adjustable output torque, said method comprising:

continuously detecting for each one of said output spindles an instantaneous value of at least one primary tightening parameter from among torque, angular position, time, clampload, and screw joint elongation;

selecting one of said output spindles as a master spindle to be operated in accordance with said at least one primary tightening parameter;

continuously comparing the instantaneous tightening parameter value for said master spindle with the instantaneous tightening parameter value of each other one of said output spindles; and continuously adjusting a limit of the output torque of each other one of said output spindles so as to generate a tightening parameter value that is substantially equal to the instantaneous tightening parameter value of said master spindle.

10. The method according to claim 9, wherein said at least one tightening parameter is torque, said master spindle is operated to accomplish a predetermined torque growth characteristic as a function of time, and each other one of said output spindles is individually controlled to adapt a torque growth characteristic thereof to conform with the torque growth characteristic accomplished by said master spindle.

11. The method according to claim 10, wherein all of said output spindles are stopped if an instantaneous torque load on anyone of said output spindles differs by more than a predetermined amount from an instantaneous torque load on any other one of the output spindles.

12. A method for loosening two or more screw joints by means of a nut running tool having two or more output spindles each having an adjustable output torque, said method comprising:

continuously detecting for each one of said output spindles an instantaneous torque value;

selecting one of said output spindles as a master spindle to be operated in accordance with said detected torque values;

continuously comparing the instantaneous torque value for said master spindle with the instantaneous torque value of each other one of said output spindles; and continuously adjusting a limit of the output torque of each other one of said output spindles so as to generate a torque value that is substantially equal to the instantaneous torque value of said master spindle; and wherein the output torque of a given one of said output spindles which is engaged with a given one of said screw joints which first becomes fully loosened is reversed so as to maintain a torque engagement between said given one of said output spindles and said given one of said screw joints which first becomes fully loosened.

* * * * *

UNITED STATES PATENT AND TRADEMARK OFFICE
CERTIFICATE OF CORRECTION

PATENT NO. : 6,047,455
DATED : April 11, 2000
INVENTOR(S) : Gunnar C. Hansson

It is certified that error appears in the above-identified patent and that said Letters Patent is hereby corrected as shown below:

Title page,
Item [56] References Cited, "U.S. PATENT DOCUMENTS" insert -- 5,175,680 12/1992 Yoneda et al --;

Column 5,
Lines 15 and 28, change "anyone" to -- any --.

Signed and Sealed this

Eleventh Day of December, 2001

*Attest:*

*Nicholas P. Godici*

NICHOLAS P. GODICI
*Attesting Officer*      *Acting Director of the United States Patent and Trademark Office*